Patented Aug. 2, 1932

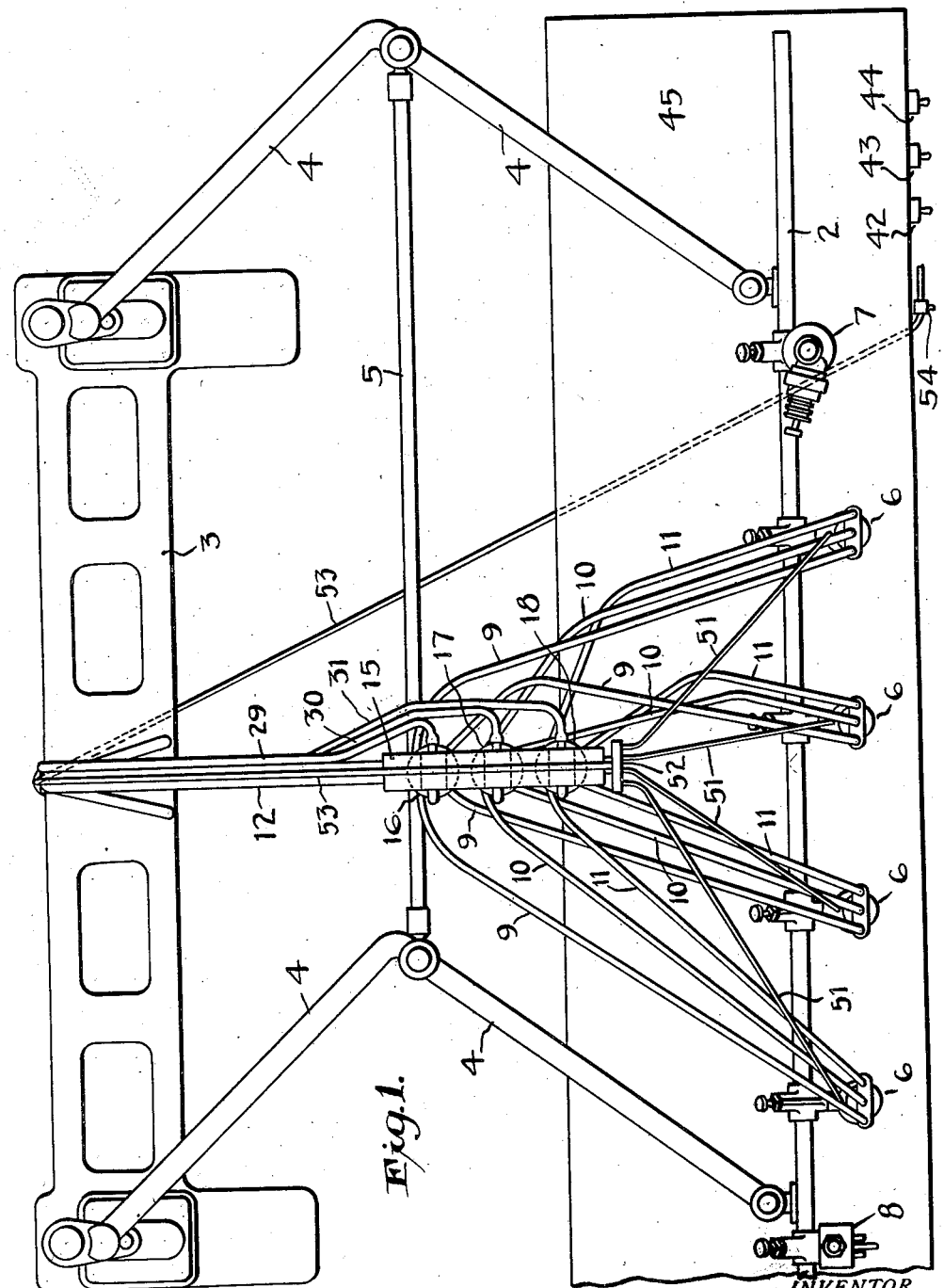

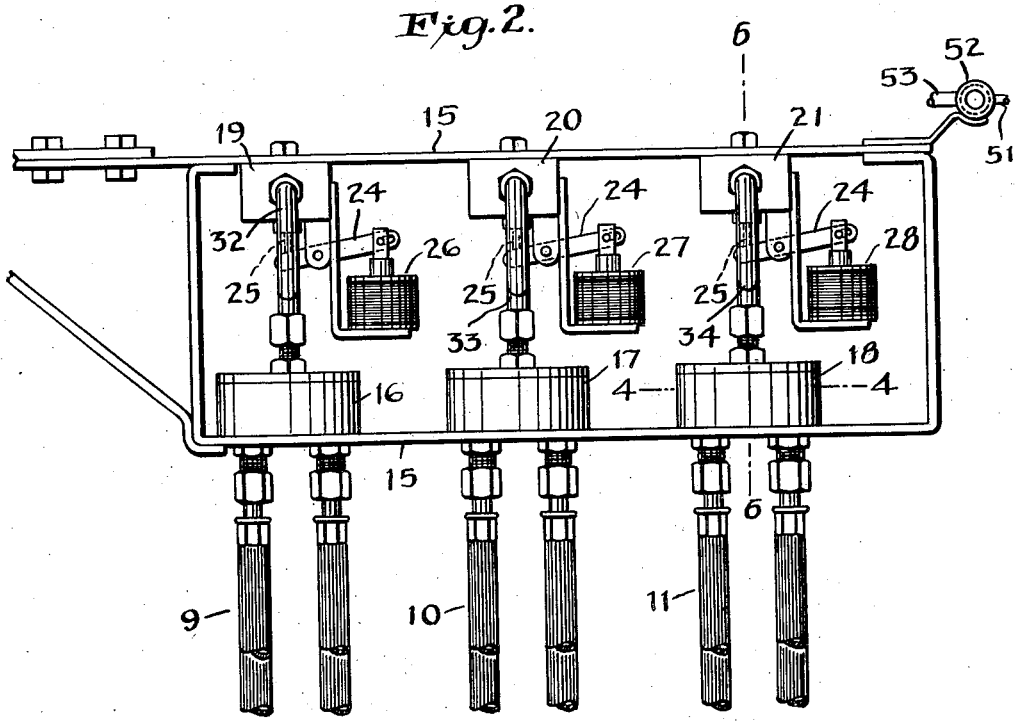

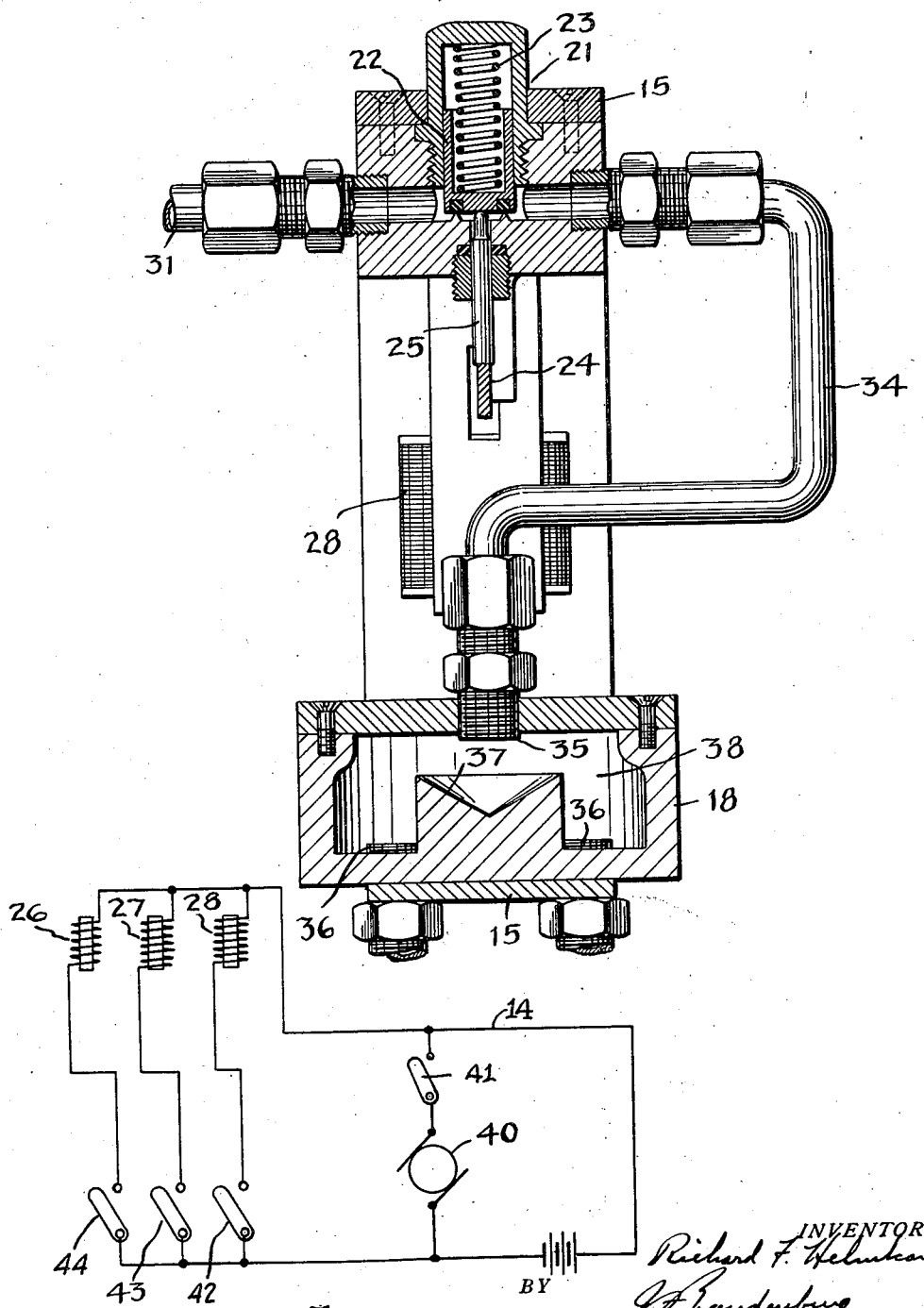

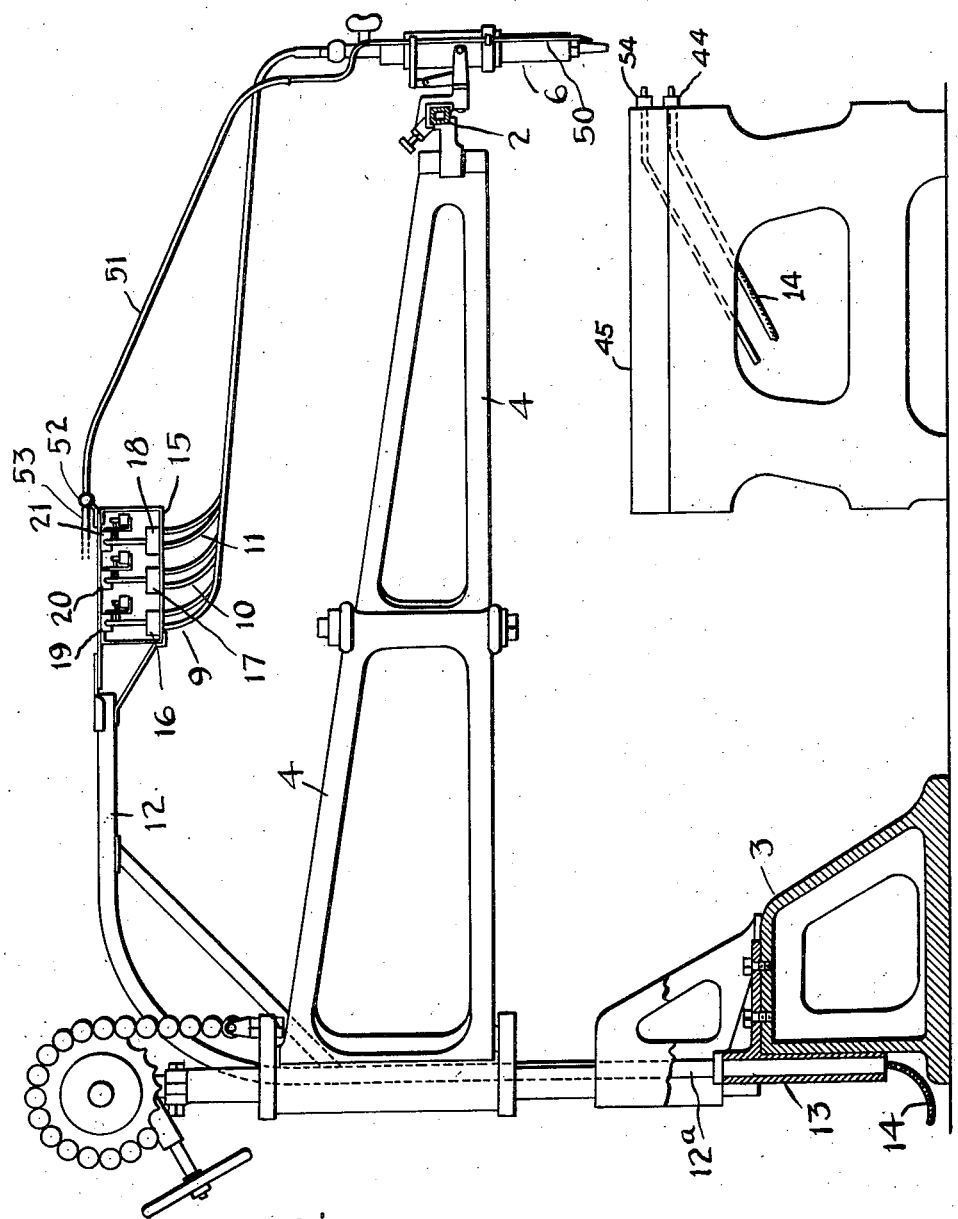

1,869,848

UNITED STATES PATENT OFFICE

RICHARD F. HELMKAMP, OF JERSEY CITY, NEW JERSEY, ASSIGNOR TO AIR REDUCTION COMPANY, INCORPORATED, OF NEW YORK, N. Y., A CORPORATION OF NEW YORK

MULTIPLE CUTTING TORCH APPARATUS

Application filed November 18, 1930. Serial No. 496,431.

This invention relates to apparatus for cutting metals with a plurality of torches operating simultaneously. In the use of universal cutting machines, for example, it is common practice to mount a number of torches on a movable frame or carriage, so that when the gases are turned on and the frame is moved by a motor-driven tracer or template-follower, all of the torches operate in similar paths and execute identical cuts. The present invention is more particularly concerned with apparatus of this type, but the plan of remote control from a central operating station which will be set forth is applicable to any form of cutting torch apparatus having a gang of torches.

The general object of the invention is to provide a relatively simple and inexpensive remote-control system for multiple cutting-torch apparatus, for increasing the productiveness of such operations, reducing the consumption of gases, facilitating good cutting and simplifying the duties of the operator.

One of the objects of the invention is to provide a system for remote central control of the supply of gases to a plurality of cutting torches, which system requires the same minimum number of remote-control valves for any number of torches. A further object is to provide a system in which all such remote control valves can be placed far enough away from the heat of the cutting to insure that the valve-actuating devices will not be injured or their operation affected.

The system involves the use of the three-hose type of cutting torch, that is to say one in which the high pressure cutting oxygen is led to the torch through one hose and passes through the torch to the cutting orifice quite independently of the preheating oxygen. Low-pressure oxygen for the preheating jets and fuel gas for the preheating jets are conducted to the torch through two other hose lines, and are mixed in the torch or its tip to form the flame jets. On a support, removed from the torches, three distributors and three remote-control valves are placed, and this number of valves and distributors suffices for all the torches no matter how numerous. All of the cutting oxygen lines of the several torches are connected to one of the distributors, all of the preheating oxygen lines of the torches are connected to another distributor, and all of the fuel gas lines of the torches are connected to the third distributor. The remote control valves control the admission of the three kinds of gas to the distributors, other hose lines leading the gases to these valves from cylinders or other sources of supply.

The remote-control valves may be of the solenoid type, with suitable wiring passing to switches at a central control station, or other types of remote-control valves operated from a distance by mechanical or fluid-pressure connections may be employed.

A further object of the invention is to enable the lighting of all the torches, as well as the distribution of preheating and cutting gases to the torches, to be controlled from a single point, all with a minimum of complication.

A further object is to provide distributors which distribute the gases evenly to the various torches and which cause the gas pressures delivered to the torches to be built up gradually when the remote-control valves are opened. The latter gives the same effect as the gradual opening of torch valves, but in this instance the supply valves can be opened instantly and the distributors will moderate the initial flow to the torches so that the jets will not be turned on impulsively.

The desired evenness of distribution to the torches, and the effect of gradual turning on of the gases, are preferably secured in a very simple manner by making each distributor after the manner of a box enclosing an expansion and equalizing chamber of large capacity as compared with the size of the hose lines. The outlets from this chamber to the torch hose lines being grouped together, all the torches receive an equal supply.

Another feature of the invention has to do more particularly with its application to universal cutting machines. In this part of the invention it is an object to dispose the remote-control valves and distributors, together with the numerous lengths of lead-in hose and torch-hose, in a manner which secures the greatest simplicity and convenience and keeps the machine as clear and free of encumbrances as possible. To this end a single arm is provided on which the distributors and remote-control valves are placed, and by which the hose and the electrical or other connections for operating the valves are also carried. By swiveling this arm so that it will float and follow the movements of the torches under the influence of the torch-hose, the length of these hose lines is much reduced as compared with the lengths that would otherwise be required and the troublesome presence of much loose hose dragging and getting in the way is avoided.

In the accompanying drawings, forming part hereof:

Fig. 1 is a plan view of a universal cutting machine with the invention applied thereto;

Fig. 2 is a side elevation of the forward portion of the arm carrying the distributors and remote-control valves;

Fig. 3 is a plan view of Fig. 2;

Fig. 4 is a section taken on the line 4—4 of Fig. 2;

Fig. 5 is a section on the line 5—5 of Fig. 3;

Fig. 6 is a section taken on the line 6—6 of Fig. 2;

Fig. 7 is a simplified wiring diagram; and

Fig. 8 is a side elevation of the machine shown in Fig. 1, with the base of the machine section partly broken away.

The universal cutting machine selected for illustration is of that type in which a torch-carrying bar 2 is carried from uprights on a base 3 by jointed arms 4 cross-connected by a link 5, so that the bar 2 is free to move in all directions, always keeping parallel to itself. Other forms of machines adapted to carry a number of torches on a universal frame or carriage, so that all torches execute identical movements in changing directions, are known.

Four cutting torches 6 are shown supported on and adjustable along the bar 2, but any number of torches may be used. The movements of machines of this type are produced by motor-driven tracers or template-followers, and a device of this character is indicated at 7, connected to the torch bar. The tracer may be disposed in any convenient position, preferably at one side of the gang of torches, and at the other side there may be a caster wheel device 8 on the bar to give additional support.

It will not be necessary to illustrate the internal construction of the torches, but each has three hose lines 9, 10 and 11 connected to it for leading high-pressure cutting oxygen, low-pressure preheating oxygen, and acetylene or other fuel gas for the preheating jets, respectively.

A forwardly-extending overhanging arm 12 is supported at a distance above the universally movable frame of the machine. This arm has a standard 12ª at the rear end, which is stepped rotatably in a socket 13 on the base 3 of the machine, so that the arm is free to swing. The arm and its standard are preferably formed of tubing, through which an electrical cable 14 (Fig. 8) can be passed. The forward part of the arm consists of a suitable support 15 for three distributors 16, 17 and 18 and three remote-control valves 19, 20 and 21.

Fig. 6 shows a section through one of the valves. Its valve member 22 is closed by a spring 23, and is opened by a solenoid, which may act through a lever 24 and a pin 25. The solenoids associated with the respective valves are marked 26, 27 and 28, and are shown mounted on brackets in the support 15, but many of the details may be varied The wires of the cable 14 are connected to the solenoids, in a manner not necessary to illustrate graphically.

To the inlet passages of the valves are connected lead-in hose lines 29, 30 and 31, which extend from tanks and regulators (not shown) for supplying high-pressure oxygen, low-pressure oxygen and fuel gas, respectively. These hose lines are disposed along the arm 15, to which they are attached in any convenient manner, as by clips or by taping.

The outlet passages of the valves are connected by pipes 32, 33 and 34 with the respective distributors 16, 17 and 18. The construction of these distributors may be varied, but the simplest and most advantageous embodiment is one in which each distributor constitutes a compact gas chest, such as the circular box form shown, this chest having an inlet 35 from one of the pipes 32, 33, 34 and a plurality of outlets grouped in proximity to the supply. For a four-torch installation each distributor requires four of these outlets, though naturally a greater number may be provided to take care of additional torches, outlets not used being suitably closed. The outlets are marked 36 in Figs. 4 and 6. They may be arranged in a circle about a baffle surface 37 opposed to the inlet 35, but a symmetrical distribution is not essential and baffling is optional. It is desirable, however, that the distributor enclose an expansion and equalizing chamber 38 of considerable volume and that the outlets to the torch hose lines be grouped in an approximately equal relation to the common supply. With suitable baffling the spatial relations can, of course, be varied, provided always that the arrangement is such that all the torches are fed equally.

All of the torch-hose lines 9 are connected to the outlets of the distributor 16, all of the torch-hose lines 10 are connected to the outlets of the distributor 17, and all of the torch-hose lines 11 are connected to the outlets of the distributor 18.

The distributor 16 and the valve 19 control the cutting oxygen. The distributor 17 and the valve 20 control the oxygen for the preheating jets of the torches. The distributor 18 and the valve 21 control the fuel gas for the preheating jets.

Fig. 7 is a schematic wiring diagram representing an electrical circuit with which are connected the motor 40 of the tracer and the solenoids 26, 27 and 28. The motor switch 41 may be located on the tracer or elsewhere at a central control station. The solenoid switches 42, 43 and 44 are located at this station, which as shown in Fig. 1 is at the front of the tracer table 45.

It is necessary to provide the torches with ignition devices. These are preferably pilot burners, which can be supplied with city gas. Pilot tubes 50 are suitably connected with the respective torches, with their burner ends in appropriate relation to the torch tips. These tubes are connected by hose lines 51 with a distributor 52 carried at the front end of the arm 12, and a hose 53 for supplying this distributor runs along the arm. This hose or conduit is preferably carried from the rear end of the arm to the control station, where it may be provided with a valve 54 of the kind used in gas stoves, for projecting the pilot flames when the preheating jets of the torches are to be ignited.

It is a feature of the invention that the preheating and cutting gases to all the torches can be turned on and off, and the preheating jets of all the torches can be lighted, by the operator without leaving his station. One of the advantages of the invention is that a minimum number of control devices at the operating station suffices for these purposes, however numerous the torches may be. As illustrated, there are three controls for the torch gases and a fourth control for the ignition devices of the torches.

The system of control, as a whole, is capable of being applied to multiple torch apparatus with little complication and at moderate expense, to secure a very decided gain in the success, productiveness and gas economy of multiple torch cutting operations.

The distributor 52 is illustrative of a modification of the distributors which have been described. It comprises a short cylindrical chamber 55 having an inlet from the hose 53 and the outlets to the hose lines 51 not equally spaced with respect to the inlet but closely enough grouped to receive the gas in equal proportion. A cylindrical baffle 56 may be disposed in the chamber to promote distribution.

In order to start the machine in operation, the switch 42 is operated to actuate the solenoid 28, which turns on the acetylene or other preheating fuel gas. This is distributed to all the torches through the hose lines 11 and issues from their preheating orifices. The valve 54 is then operated to shoot the pilot flames to ignite the acetylene. Next the switch 43 is operated to actuate the solenoid 27, which causes low pressure oxygen to be distributed through the hose lines 10 to all the torches, this oxygen mixing with the fuel gas and establishing the preheating jets. When the starting points of the cut have been sufficiently heated, the switch 44 is operated to actuate the solenoid 26, with the result that high pressure oxygen is distributed to the torches through the hose lines 9, this oxygen forming the cutting jets. When the cutting action starts, the switch 41 is operated to start the motor which drives the tracer, and all of the torches are set in similar motion.

It will be understood that the torches have the usual valves for adjusting the preheating oxygen and fuel gas to produce flames of suitable size and composition.

Advantages of the invention, as previously indicated, are that only three solenoid valves, or only three remote-control valves of whatever type, are required for any number of torches, and that these valves and their actuating devices are away from the high temperature of the cutting operation. The advantage of collecting all the remote control valves and distributors, together with the hose and control connections, on a single arm or support, so that they are brought together and leave the machine clear, has also been indicated. The freedom of this support to float with the movement of the torches is also important. The uniform feeding of the torches from the common supplies has been sufficiently discussed.

It will be evident to those skilled in the art that the invention can be realized notwithstanding various departures from the concrete and preferred embodiment which has been described, and it will also be understood that the essentials of the system of control are applicable to a great variety of cutting machines in which a plurality of torches are to be operated at the same time.

I claim:

1. In a multiple cutting torch apparatus, the combination of a plurality of cutting torches each of which has three flexible conduits for leading cutting oxygen, preheating oxygen and preheating fuel gas, respectively, to the torch, a common movable support for torches, distributors to which the supply conduits of all the torches are connected according to the gases which they are to conduct. a separately movable arm supporting said distributors, means for supplying cutting oxygen, preheating oxygen and fuel gas to the respective distributors, and three remote-control valves located at a distance from the torches and controlling the supply of gases to the respective distributors.

2. The combination set forth in claim 1, further characterized in that the distributors provide expansion and equalizing chambers to cause a gradual rise in delivery pressure of the gases at the jets when the valves are opened quickly.

3. The combination set forth in claim 1, further characterized in that the distributors provide expansion and equalizing chambers to cause a gradual rise in delivery pressure of the gases at the jets when the valves are opened quickly, and that the outlets from the distributor chambers to the torch conduits are grouped in equal relation to the supply.

4. The combination with a universal cutting apparatus having a torch-carrying frame mounted for universal movement in a plane and carrying a plurality of cutting torches, each of which torches has three hose lines for leading cutting oxygen, preheating oxygen and preheating fuel gas, respectively, to the torch, of an arm mounted to overhang said universally movable frame, distributors on said arm, to which distributors said torch hose lines are connected according to the gases which they are to conduct, means for supplying cutting oxygen, preheating oxygen and fuel gas to the respective distributors, and three remote-control valves also carried by said arm and connected with the respective distributors to control the admission of the gases thereto.

5. The combination with a movable frame carrying a plurality of cutting torches, of a floating arm, torch-hose lines extending from said arm to the several torches, lead-in hose lines, and valves and distributors on the arm for supplying and distributing the different gases to the torch-hose lines.

6. The combination with a movable frame carrying a plurality of cutting torches, of a floating arm, torch-hose lines extending from said arm to the several torches, lead-in hose lines, valves and distributors on the arm for supplying and distributing the different gases to the torch-hose lines, and connections extending to said arm to operate said valves.

7. The combination with a movable frame carrying a plurality of cutting torches, of a floating arm, torch-hose lines extending from said arm to the several torches, lead-in hose lines, valves and distributors on the arm for supplying and distributing the different gases to the torch-hose lines, and additional means carried by said floating arm to supply and distribute gas to pilot burners associated with the torches.

8. In a multiple cutting torch apparatus, the combination of a plurality of cutting torches each of which has three conduits for leading cutting oxygen, preheating oxygen and preheating fuel gas, respectively, to the torch, distributors to which the supply conduits of all the torches are connected according to the gases which they are to conduct, means for supplying cutting oxygen, preheating oxygen and fuel gas to the respective distributors, three valves located at a distance from the torches and controlling the supply of gases to the respective distributors, a set of control devices grouped at a common operating station, and operating connections between said devices and said valves.

9. In a multiple cutting torch apparatus, the combination of a plurality of cutting torches each of which has three flexible conduits for leading cutting oxygen, preheating oxygen and preheating fuel gas, respectively, to the torch, distributors to which the supply conduits of all the torches are connected according to the gases which they are to conduct, means for supplying cutting oxygen, preheating oxygen and fuel gas to the respective distributors, three valves located at a distance from the torches and controlling the supply of gases to the respective distributors, ignition means associated with the several torches, a set of control devices at a common operating station, operating connections between said devices and said valves, and means for controlling the ignition means of all the torches from said station.

10. In a multiple cutting torch apparatus, the combination of a plurality of cutting torches each of which has three flexible conduits for leading cutting oxygen, preheating oxygen and preheating fuel gas, respectively, to the torch, distributors to which the supply conduits of all the torches are connected according to the gases which they are to conduct, means for supplying cutting oxygen, preheating oxygen and fuel gas to the respective distributors, three valves located at a distance from the torches and controlling the supply of gases to the respective distributors, ignition means associated with the several torches, a set of control devices at a common operating station, operating connections between said devices and said valves, and another control device at said station connected with the ignition means of all the torches.

11. In a multiple cutting torch apparatus, the combination of a plurality of cutting torches each of which has three flexible conduits for leading cutting oxygen, preheating oxygen and preheating fuel gas, respectively, to the torch, distributors to which the supply conduits of all the torches are connected according to the gases which they are to conduct, means for supplying cutting oxygen, preheating oxygen and fuel gas to the respective distributors, three valves located at a distance from the torches and controlling the supply of gases to the respective distributors, pilot burners associated with the several torches, flexible conduits for distributing gas to all said pilot burners, a common pilot-fuel supply conduit connected with the several distributing conduits, a set of control devices at a common operating station, operating connections between said control devices and the valves previously mentioned, and an additional device at the control station controlling said common pilot-fuel supply conduit.

12. In a multiple cutting torch apparatus, the combination of a plurality of cutting torches each of which has three flexible conduits for leading cutting oxygen, preheating oxygen and preheating fuel gas, respectively, to the torch, distributors to which the supply conduits of all the torches are connected according to the gases which they are to conduct, means for supplying cutting oxygen, preheating oxygen and fuel gas to the respective distributors, three valves located at a distance from the torches and controlling the supply of gases to the respective distributors, pilot burners associated with the several torches, flexible conduits for distributing gas to all said pilot burners, a common pilot-fuel supply conduit connected with the several distributing conduits, said conduit leading to a common operating station, a valve in said conduit at the control station for passing an enlarged flow of fuel to all the pilot burners of all the torches, a set of control devices also placed at said station, and operating connections between said devices and the three valves previously mentioned.

RICHARD F. HELMKAMP.